United States Patent [19]

Carter

[11] Patent Number: 4,895,475
[45] Date of Patent: Jan. 23, 1990

[54] ASSEMBLY OF CYLINDER AND SHAFT WITH LOW STRESS COUPLING AND METHOD OF MAKING SAME

[76] Inventor: Donald L. Carter, 2316 Donna Dr., Vestal, N.Y. 13850

[21] Appl. No.: 159,355

[22] Filed: Feb. 23, 1988

[51] Int. Cl.[4] .................. B25G 3/00; F16B 7/00; F16D 1/00; B21D 35/00
[52] U.S. Cl. ..................................... 403/383; 29/115; 29/129; 29/469.5; 29/525; 156/294; 156/295; 403/365; 403/265
[58] Field of Search ............ 29/525, 469.5, 115, 29/129, 455.1; 464/32, 175, 30, 183, 31; 156/293, 294, 295; 403/383, 372, 365, 371, 265

[56] References Cited

U.S. PATENT DOCUMENTS

| Re. 28,868 | 6/1976 | Spaeder, Jr. ............... | 156/294 X |
|---|---|---|---|
| 2,407,559 | 9/1946 | Kratz ............... | 29/455.1 X |
| 2,702,926 | 3/1955 | Rahaim ............... | 403/265 X |
| 2,707,694 | 5/1955 | Standring ............... | 156/295 X |
| 2,751,765 | 6/1956 | Rowland et al. ............... | 29/455.1 X |
| 2,864,967 | 12/1958 | Redick ............... | 29/525 UX |
| 3,084,003 | 4/1963 | Matt ............... | 29/525 UX |
| 3,129,502 | 4/1964 | Olson ............... | 29/455.1 X |
| 3,160,429 | 12/1964 | Martins ............... | 403/371 X |
| 3,438,660 | 4/1969 | Steiner ............... | 403/372 X |
| 3,494,676 | 2/1970 | Compton ............... | 403/372 X |
| 3,661,388 | 5/1972 | Leslie ............... | 403/265 X |
| 3,673,777 | 7/1972 | Weber ............... | 29/525 X |
| 4,306,838 | 12/1981 | Trainer ............... | 464/30 X |
| 4,636,106 | 1/1987 | Waisbrod ............... | 403/372 X |
| 4,793,042 | 12/1988 | Easter ............... | 156/294 X |

FOREIGN PATENT DOCUMENTS

| 509945 | 2/1955 | Canada ............... | 403/383 |
|---|---|---|---|
| 231231 | 3/1925 | United Kingdom ............... | 403/383 |

*Primary Examiner*—Charlie T. Moon
*Attorney, Agent, or Firm*—K. P. Johnson

[57] ABSTRACT

Method of constructing an assembly having as one element a right circular cylinder with center bore and accurately machined and lapped circular surfaces and perpendicular end faces, and as another element a hollow shaft fitted and joined within said center bore in a manner unable to transmit distorting strain to said cylinder when said shaft has a coefficient of expansion greater than that of said cylinder. The shaft either has an interrupted exterior with severely limited contact areas for joining adhesively to the bore surface or is of other structure that is incapable of straining the cylinder.

7 Claims, 1 Drawing Sheet ably of a right circular cylinder 10 having end faces 1 and a hollow shaft 12. Shaft 12 is formed with annular collars 13 that are segmented by longitudinal slots 14 at ninety degree intervals about the shaft. The shaft is joined to the cylinder within its central bore 15 at lands 16 by adhesive.

ASSEMBLY OF CYLINDER AND SHAFT WITH LOW STRESS COUPLING AND METHOD OF MAKING SAME

FIELD OF THE INVENTION

This invention relates generally to a construction technique of joining a rotatable right circular cylinder and shaft and, more particularly, to a method of making such junction free of transmitted distorting strain in the cylinder.

BACKGROUND OF THE INVENTION

In the construction of precision machine components, such as a right circular cylinder and shaft rotating at high speed in a gyroscope, a hydraulic actuator or bearing in a magnetic disc memory, the dimensions of the diameter, length, cylindricity and squareness all become critical Careful machining, lapping and measuring are necessary to achieve the demanded accuracy that is typically within a few microinches.

The processes do not readily lend themselves to inexpensive mass production of such components because of the repetitive dimensional checking and finishing, such as lapping and honing, that can be required. This is especially true with elements that rotate on gas films and must avoid interference with mating parts. Such elements operate with little clearance and need to be held to close tolerances to achieve the stability and reliability necessary.

Precision and fabrication efficiency, which can be achieved with existing production equipment, can also be limited by the design of the components. Although redesign can often aid the manufacturing processes, changes in either a component configuration or its processing may bring about other problems.

OBJECTS AND SUMMARY OF THE INVENTION

It is accordingly a primary object of this invention to provide a method of constructing an assembly of a bored right circular cylinder with input or output shaft which enables the two cylinder ends to be finished concurrently to provide parallel surfaces perpendicular to the cylinder axis and later joining the cylinder and shaft in a low stress joint.

Another important object of this invention is to provide a method of joining a right circular cylinder having a center bore with a shaft in which the shaft cannot transmit stresses sufficient to strain or distort the cylinder during subsequent environmental changes.

Yet another object of this invention is to provide a method of constructing a bored right circular cylinder to be precisely made on conventional grinding, lapping and honing equipment and later assembled with the shaft while retaining the original cylinder precision as to cylindricity, end face parallelism, squareness and flatness.

A still further object of this invention is to provide a right circular cylinder and shaft assembly having narrower dimensional tolerances and improved dimensional stability through varying temperatures.

It is also a significant object of this invention to provide a right circular cylinder suitable for use in a high speed gas bearing and joined with an, input or output shaft in such a manner that the shaft(can sever its bond with the cylinder in the event of bearing seizure and remain an integral link between devices attached at the opposite shaft ends.

The foregoing objects are attained in accordance with the invention by separately fabricating a bored right circular metal cylinder with known precision equipment that can machine, lap or hone the cylinder and its ends to a high degree of accuracy as to cylindricity, end face parallelism, end squareness and flatness relative to the cylindrical surface without the presence of a shaft, thus permitting concurrent finishing of the entire cylinder ends to dimensional tolerance of a few microinches. The shaft for assembly with the cylinder bore is separately machined to less accuracy and made of hollow stock that is slotted or formed within the bore area to weaken the shaft sufficiently to prevent transmission of any shaft strain to the cylinder that may produce cylinder distortion. The shaft is attached to the cylinder only at limited surface areas that are adhesively attached to the bore wall for accomplishing assembly.

This method of fabrication and the resulting assembly enable construction of a cylinder having highly accurate dimensions that is especially suitable for rotation at high speed in a gas bearing demanding extremely narrow clearances. With known fabrication methods the cylinder shaft is integral with the cylinder and interferes with end face lapping and honing procedures, making the components labor intensive and costly. The invention, by using a separate shaft, permits the cylinder end faces to be lapped and honed with better precision and alignment, and easier for mass production of such components.

With the known assembly of cylinder and shaft as two components, stress in one can effect distortion in the other. Since the cylinder usually requires the greatest precision and tolerance, the shaft of this invention has been weakened by using a hollow element that is made further pliant by wall formation that may consist of removal of wall material or special wall configurations at the zone of attachment. Bosses or projections are used as the exterior attachment surfaces of the shaft for adhesively joining cylinder and shaft.

The foregoing and other objects, features and advantages will become apparent from the following more particular description of a preferred embodiment of the invention with reference to the accompanying drawing.

DESCRIPTION OF THE PREFERRED EMBODIMENT

Figure 1:
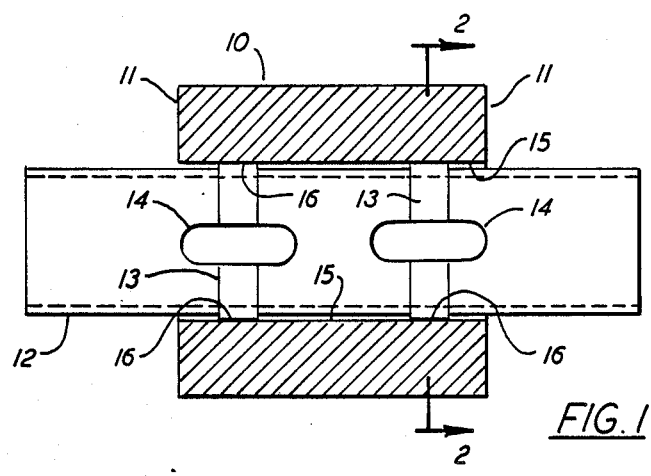
FIG. 1 is a sectional elevation view of a right circular cylinder and shaft constructed in accordance with the principles of this invention.
Figure 2:
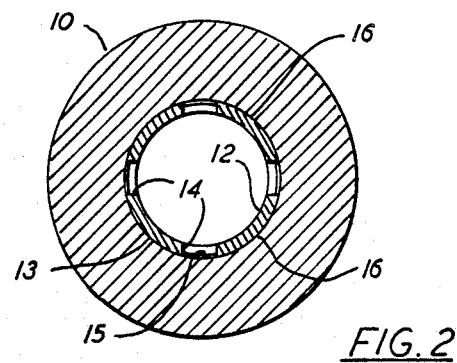
FIG. 2 is a sectional end view taken along the line 2—2 in FIG. 1.

Referring to FIGS. 1 and 2, there is shown an assembly of a right circular cylinder 10 having end faces 1 and a hollow shaft 12. Shaft 12 is formed with annular collars 13 that are segmented by longitudinal slots 14 at ninety degree intervals about the shaft. The shaft is joined to the cylinder within its central bore 15 at lands 16 by adhesive.

Such an assembly is typically of metal, such as steel, and may be used in a gyroscope, magnetic drum memory rotor, bearing or the like. The cylinder is enclosed by a journal or sleeve (not shown) for relative rotation at extremely high speeds. Usually the right circular cylinder and its journal are separated from each other by a thin gas film such as air, that is either a self-acting film or one produced by pressurized jacking fluid. With an accurately machined assembly and journal, rotation is accomplished with little friction and a high degree of stability, due t the film stiffness. Achievement of the necessary dimensional accuracy within a few millionths of an inch for the cylindricity, end face perpendicularity, end face parallelism, squareness and flatness requires hours of machine finishing and measuring, thus making the final product unreasonably costly.

It has been discovered that a significant portion of the manufacturing time can be eliminated and the finishing equipment used to better efficiency by fabricating right circular cylinder 10 as a separate component without an integral shaft. When the cylinder is machined alone, its two end faces 11 can be lapped and honed simultaneously and in large groups in a flat lapping machine during a single setup thereby attaining improved control and accuracy. Absence of shaft 12 permits the lapping plates to advance entirely across the end faces without encountering a limiting projection. This procedure also enables fabricating the end faces with improved parallelism and perpendicularity relative to the exterior curved surface of the cylinder and results in improved end face flatness, all critically necessary for a gas or fluid bearing support system.

Shaft 12, which may be either an input or output shaft, is formed as a separate element from a machined rod and is preferably hollow. However, the addition of a conventional separate shaft to bore 15 of cylinder 10 by known techniques such as a press fit, brazing or adhesive, transmits stresses to cylinder 10, producing unacceptable distortive strain sufficient to exceed the required manufacturing tolerances. Had the shaft been an integral portion of the cylinder, internal stresses would have been relieved via heat treatment. It has been found that cylinder 10 and shaft 12 can be formed separately and joined adhesively or by brazing at low temperatures at connections having limited contact area such that lower stresses from the shaft due to temperature changes are insufficient to produce strain in the cylinder.

In the preferred embodiment, hollow shaft 12 is formed from stock that is drilled or bored leaving sufficient wall thickness for the anticipated loading. The tube is machined and ground on its outer surface to provide a plurality of annular collars 13 that fit within central bore 15 of cylinder 10. In this embodiment, two are shown. The shaft wall is then machined to provide slots 14 that segment collars 13 and the shaft wall at ninety degree intervals. The longitudinal axis of each slot parallels the longitudinal axis of the shaft. An adhesive, preferably of the anerobic type, (curable in the absence of air) is applied to the outer surfaces of the collar segments, the cylinder and shaft joined, and the adhesive cured. This adhesive, however, will break loose if bearing seizure were to occur and cylinder 10 were suddenly stopped from rotating. A weakened shaft side wall, due to piercing slots 14 and the small junction areas between the segments of collars 13 and surface of bore 15, limits any forces transmitted radially to cylinder 10 by the shaft due to its different coefficient of expansion or other external force applied to the shaft.

Contact segment area is preferably kept at the minimum necessary to start, stop or carry the loading on the shaft and cylinder. The size of the collar segments and area of remaining shaft wall depend upon the cylinder and shaft application and torque required. It is desirable that the shaft be unable to transmit or produce strain in cylinder 10 due to differential coefficients of expansion between the two members 10 and 12. Slots 14 are located and are of size and extent such that there is discontinuity of contact area in any transverse section across the assembled members. By providing the discontinuity, the shaft is unable to transmit significant stresses to the cylinder when the former has the greater coefficient of expansion. Slots 14 may be placed at other locations and parallel or at acute angles relative to the longitudinal axis of the shaft. The number or position of slots 14 need not be prescribed but are more correctly determined by the loading and manufacturing methods employed.

Figure 3:
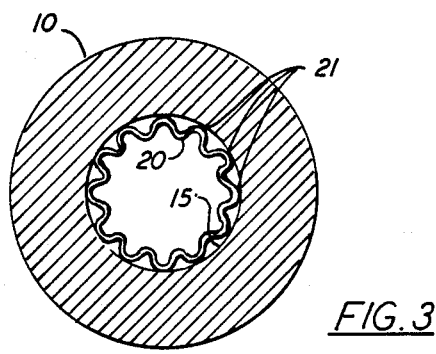
FIG. 3 is an alternative embodiment of the method of joining a right circular cylinder and shaft as an assembly in accordance with the invention.

An alternative attachment technique between a shaft and cylinder is illustrated in FIG. 3 where the shaft wall 20 is formed in accordion or pleated fashion to produce a plurality of attachment points at external peaks 21. Attachment to the surface of bore 15 is preferably with an adhesive. The pleating provides discontinuous circumferential attachment areas and the surface convolutions of the shaft enable expansion of the shaft wall without transmitting contorting stress to cylinder 10.

In the foregoing embodiments, a highly accurate right circular cylinder can be fitted with a separate input or output shaft without concern that the union will produce distorting strain in the cylinder. This enables the cylinder to be manufactured with ultimate precision and used reliably in gas bearings. Further, because the end faces of the cylinder can be finished in a flat lapping machine across their entire surfaces with better accuracy the improved finish renders the cylinder highly suitable for thrust bearing applications. In the event, cylinder 10 is used in a gas bearing and seizure occurs, shaft 12 can break free of the cylinder, yet retain any elements secured to its ends.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of assembling a cylinder and shaft with no strain transmission from the shaft to the cylinder comprising the steps of:
    forming a right circular cylinder having a longitudinal center bore for receiving therein a shaft, said cylinder having been machined to precise final dimensions and end face perpendicularity and flatness;
    forming a hollow shaft to fit within said bore and having a plurality of raised annular collars having predefined areas thereon for attachment to the surface of said bore with said collars each interrupted by one or more slots through the wall of said shaft to intersect and segment said collars such that no transverse right section of said shaft has a continuous circumferential attachment area; and
    assembling said shaft within said bore by joining said attachment areas with said mating bore surface.

2. The method as described in claim 1 wherein said slot axis are each parallel to the longitudinal axes of said shaft.

3. The method as described in claim 2 wherein the longitudinal axes of said slots lie at ninety degree intervals about said shaft.

4. The method as described in claim 2 wherein said slots are symmetrically arranged about said shaft axis.

5. The assembly of a cylinder and shaft comprising:
a right circular metal cylinder having a central bore and parallel flat end faces perpendicular to the longitudinal axis of said cylinder, said cylinder having been machined to final dimensions;
a hollow shaft joined to said cylinder on the surface of said bore at predefined areas such that no no transverse right section taken across said shaft has a continuous circumferential attachment area to said bore surface, the wall of said shaft having at least one raised annular collar thereon providing a said attachment area on its periphery and being segmented by at least one longitudinal slot in said wall interrupting said collar.

6. The assembly as described in claim 5 wherein said wall has a plurality of said collars within said bore and whose peripheries form said attachment areas, said collars being segmented by longitudinal slots in said wall and said attachment areas being joined to said bore surface by adhesive.

7. The assembly as described in claim 6 wherein said slots are disposed symmetrically about said shaft.

* * * * *